(12) United States Patent
Bodwell et al.

(10) Patent No.: US 7,631,102 B2
(45) Date of Patent: Dec. 8, 2009

(54) SYSTEM AND METHOD OF MEDIATING A WEB PAGE

(75) Inventors: Walter R. Bodwell, Austin, TX (US); Clay Davis, Austin, TX (US); Michael C. Klobe, Austin, TX (US)

(73) Assignee: BMC Software, Inc., Houston, TX (US)

( * ) Notice: Subject to any disclaimer, the term of this patent is extended or adjusted under 35 U.S.C. 154(b) by 651 days.

(21) Appl. No.: 11/189,057

(22) Filed: Jul. 25, 2005

(65) Prior Publication Data

US 2005/0256955 A1    Nov. 17, 2005

Related U.S. Application Data

(63) Continuation of application No. 09/710,214, filed on Nov. 10, 2000, now Pat. No. 6,954,783.

(60) Provisional application No. 60/165,102, filed on Nov. 12, 1999, provisional application No. 60/165,103, filed on Nov. 12, 1999.

(51) Int. Cl.
  *G06F 15/16* (2006.01)
(52) U.S. Cl. ........................ 709/246; 709/203; 709/219
(58) Field of Classification Search ................ 709/203, 709/217–219, 224, 226, 246
See application file for complete search history.

(56) References Cited

U.S. PATENT DOCUMENTS

| 5,835,718 | A | 11/1998 | Blewett |
| 5,974,572 | A | 10/1999 | Weinberg et al. |
| 6,006,260 | A | 12/1999 | Barrick, Jr. |
| 6,021,435 | A | 2/2000 | Nielsen |
| 6,052,730 | A * | 4/2000 | Felciano et al. ............. 709/225 |
| 6,081,829 | A * | 6/2000 | Sidana ....................... 709/203 |
| 6,138,157 | A | 10/2000 | Welter et al. |
| 6,178,439 | B1 * | 1/2001 | Feit .......................... 709/200 |
| 6,185,598 | B1 * | 2/2001 | Farber et al. ................ 709/200 |
| 6,286,046 | B1 * | 9/2001 | Bryant ....................... 709/224 |
| 6,356,934 | B1 | 3/2002 | Delph |
| 6,401,077 | B1 | 6/2002 | Godden et al. |
| 6,510,462 | B2 | 1/2003 | Blumenau |

FOREIGN PATENT DOCUMENTS

| CN | 1433549 A | 11/2000 |
| CN | 1249608 C | 4/2006 |
| JP | 2004-500629 A | 1/2004 |
| KR | 10-0748770 | 8/2007 |

OTHER PUBLICATIONS

Musciano et al. "HTML: The Definitive Guide, Third Edition" O'Reilly & Associates, Inc. Aug. 1998, chapter 10, pp. 320-329.*

(Continued)

*Primary Examiner*—David Lazaro
(74) *Attorney, Agent, or Firm*—Sprinkle IP Law Group

(57) ABSTRACT

A system and method for mediating a web page at an intermediate server. The system and method can include receiving a web page from a target web server, ensuring that the web page is not cached and changing links in the web page to refer to the intermediate server.

32 Claims, 1 Drawing Sheet

OTHER PUBLICATIONS

Nicol et al., "Footsteps: Trail-blazing the Web", Computer Networks and ISDN Systems, vol. 27, No. 6, pp. 879-885.

Nicol, et al. "Footsteps: Trail-blazing the Web" Computer Networks and ISDN Syste4ms, North Holland Publishing, vol. 27, No. 6, p. 882.

Business Wire, "Citation," 1997.

Edge Publishing, "Edge: work group computing report," 1997.

Keynote Systems Company, "Keynote ships first real-time web site performance measurement and management solution", 1997.

Keynote Systems Company, Keynote systems clocks true speed on the internet highway at 5,000 characters per second, or only 40 kbps, 1997.

Keynote Systems Company, "Press Release 1997".

Know-it Software Products, "Know-it Server Trak", 1997.

Internet Week, "Keynote Software Measures Internet Service", 1996.

Pitkow, "In Search of Reliable Usage Data on the WWW", Computer Neworks and ISDN Systems, vol. 29, No. 8-13, pp. 1343-1355.

Jacobs, et al. "Filling HTML forms simultaneously: CoWeb-Architecture and Functionality", Comptuer Networks and ISDN Systems, vol. 28, No. 11, pp. 1385-1395.

Patent Cooperation Treaty, International Search Report issued in International Patent Application No. PCT/US00/30991 dated Mar. 21, 2003, BMC Software, 7 pages.

Patent Cooperation Treaty, International Preliminary Examination Report issued in International Patent Application No. PCT/US00/30991 dated Jun. 24, 2003, BMC Software, 3 pages.

Patent Cooperation Treaty, Written Opinion issued in International Patent Application No. PCT/US00/30991 dated Apr. 29, 2003, BMC Software, 2 pages.

Korean Intellectual Property Office, Notice of Preliminary Rejection issued in Korean Patent Application No. 10-2002-7006145 dated Nov. 14, 2006, BMC Software, 5 pages.

Chinese Patent Office, First Office Action issued in Chinese Patent Application No. 00816817.2 dated Dec. 24, 2004, BMC Software, 16 pages.

Chinese Patent Office, Second Office Action issued in Chinese Patent Application No. 00816817.2 dated Jul. 1, 2005, BMC Software, 3 pages.

European Patent Office, Communication pursuant to Article 96(2) EPC in European Application No. 00 980 343.8 dated Oct. 28, 2004, BMC Software, 5 pages.

European Patent Office, Communication pursuant to Article 96(2) EPC in European Application No. 00 980 343.8 dated Dec. 6, 2006, BMC Software, 6 pages.

* cited by examiner

SYSTEM AND METHOD OF MEDIATING A WEB PAGE

CROSS-REFERENCE TO RELATED APPLICATION

This application is a continuation of, and claims a benefit of priority under 35 U.S.C. 120 of the filing date of U.S. patent application Ser. No. 09/710,214 by inventors Walter R. Bodwell, Clay Davis and Michael C. Kiobe entitled "System and Method of Mediating a Web Page" filed on Nov. 10, 2000 now U.S. Pat. No. 6,954,783, which in turn claims the benefit of priority under 35 U.S.C. § 119 to provisional patent application numbers 60/165,102 filed Nov. 12, 1999 and 60/165,103 filed Nov. 12, 1999, the entire contents of which are hereby expressly incorporated by reference for all purposes.

TECHNICAL FIELD OF THE INVENTION

The present invention relates generally to web page systems and methods, and more particularly, a system and method for software mediation of a web page at an intermediate server.

BACKGROUND OF THE INVENTION

As web sites become more ubiquitous, businesses are increasingly interested in setting performance goals and quality standards for their web sites. One way to achieve these objectives is to simulate an end user's experience with a company web site. By simulating the end user's experience, a company can determine the integrity of links and resources in the page and rate a customer's experience against the operational goals defined by the business. Furthermore, information technology departments of companies will be better able to track and measure critical web resources. In addition to simulating an individual customer's experience, simulating multiple customers simultaneously will allow companies to stress test a web site and detect trends in site performance, thus allowing the company to address problems before they arise.

One way to simulate a user's path through a web site is to record all the requests made by a user. In order to do this, it is generally necessary to route a user's requests through an intermediate server, typically a proxy server. However, the use of proxy servers requires significant technical expertise because each browser must be individually configured to go through the proxy server. This problem is accentuated by the fact that different versions of the same browser can require unique configuration. A further limitation on the use of proxy servers to track a user's web page requests exists because user's requests can not be routed through any other proxy server. This is becoming increasingly problematic, as a growing number of companies require employee requests to be routed through a company proxy server. Proxy servers are used in order to limit the web sites to which an employee has access and to gain efficiencies by caching popular web sites. If web site content is cached at a proxy server, any response to a request for that web site will come from the proxy server's memory and not from the target web site. Thus, the request will never actually go beyond the company's servers and will therefore not be recordable by the second proxy server, i.e. the proxy server that would have tracked the user's request.

Several of the disadvantages of using proxy servers can be overcome by routing web page requests through an intermediate web server. When a web page request is made from the intermediate web server, the HTML text of the target web site will be changed or mediated so that links in the target web site are first routed through the intermediate web server. For example, several web sites have been developed to mediate target web site text so that the text reflects the dialect of social groups or popular cartoon and movie characters. Furthermore, these sites mediate web links so that any pages requested from the mediated page are also mediated. The methods used by these web sites, however, do not handle dynamic content such as JavaScript, forms, side image maps and other essential web techniques.

SUMMARY OF THE INVENTION

The present invention provides a system and method that substantially eliminates or reduces disadvantages and problems associated with previously developed systems and methods used for mediating pages.

More particularly, the present invention provides a system and method for mediating a web page at an intermediate server. The method includes the steps of ensuring that web page is not cached and changing links in web page to refer to an intermediate server. In the present invention, the links that are modified to refer to the intermediate server can either be absolute references or relative references.

The present invention provides substantial advantages over previously developed systems for mediating web pages by allowing dynamic content to be mediated.

The present invention provides yet another important technical advantage by preventing web pages from being cached by a user's computer or a proxy server.

The present invention provides yet another important technical advantage by allowing cookies to be mediated.

The present invention provides yet another important technical advantage by being able to mediate a significantly greater number of web pages than previous methods.

The present invention provides yet another important technical advantage because it does not require additional software to be installed on the user's computer, nor does it require modification of a user's web browser.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

For the purposes of the present invention, "content" refers to the HTML and other data returned to a user's browser by a web page in response to a user's commands (e.g., when the user selects a link). A "static" web page contains content that is returned to a user's browser which does not change over time. A "dynamic" web page represents a page that can contain different, non-preformatted content that changes over time in response to the same user's commands. A "path" or "web path" is a succession of requests made in a particular order. A "teaching session" refers to the user defining a path such, that the path can be later replayed.

Figure 1:
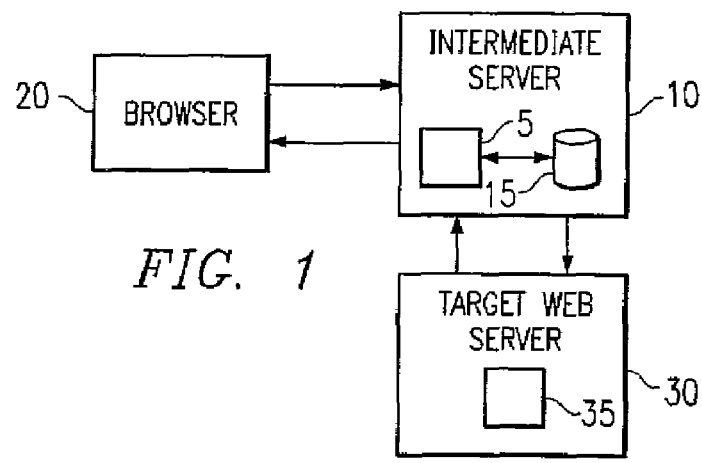
FIG. 1 shows a diagrammatic representation of one system in which the present invention can be implemented.

The present invention provides a system and method for mediating a target web page in a manner that can handle both static and dynamic content in the web page. FIG. 1 is a diagrammatic representation of a system in which the present invention can record a user's path through the web. A user can access a software program 5 at an intermediate server 10 via a web browser 20. In one embodiment, the user, after accessing software program 5 at intermediate server 10, can use web browser 20 to provide a path name (e.g. "path 1") and a starting URL to software program 5. The path name and starting URL can be saved to database 15. The path name is used to categorize a particular path defined by the user, while the starting URL is the starting point of the user's path. Once the user indicates they are ready to begin defining a path by clicking on a "start" button, for example, the software program 5 can then cause a display window to open in web browser 20. The display window is a new window in browser 20 in which the content received in response to a user's commands will be displayed. The user's request for the starting URL will be sent from browser 20 to software program 5. Software program 5 forwards the request to target web server 30. The target web server 30 will return web page 35, which corresponds to the starting URL, to intermediate server 10. Software program 5 can then mediate the content so that any additional requests made by a user from the mediated content of web page 35 will be routed through intermediate server 10. Mediation of the content can be done according to the method described in conjunction with FIG. 2.

Software program 5, after mediating the content, can then communicate the mediated content to the display window of web browser 20. From a user's perspective, the page displayed in the display window of web browser 20 can look identical to the view which would have been displayed had the web page's content not been mediated (i.e., if the user had directly accessed the target web server 30). However, the present invention can cause the display window of web browser 20 to be opened without navigation or status bars. This is done so that a user will not inadvertently circumvent the path defining process by directly entering a URL at the top of the browser 20 rather than accessing URLs through the mediated content displayed in the display window.

As the user enters commands or requests from the mediated content of web page 35, software program 5 saves the commands in database 15. Additionally, other information such as headers and cookies corresponding to a command can be stored in database 15. Software program 5 then forwards the additional requests for a new web page 35 to target web server 30. As an example, the user can make a request from the mediated content of web page 35 in the display window of browser 20, and software program 5 can record the request at database 15 and then forward the request to target web server 30. Software program 5, again receiving the content of target web page 35 from target web server 30, mediates the content of the response from web page 35 and returns the mediated data to the display window of browser 20. Software program 5 will also record content such as cookies and headers returned by target web server 30. It should be noted that the content of web page 35 could change as the user makes requests to different URLs. Additionally, target web server 30 may change as requests are made for new web pages.

Generally, the present invention can capture all interactions that require a server's intervention. When the user is done defining a path, the user can stop the path defining process, and the path is saved under the path name defined by the user.

Figure 2:
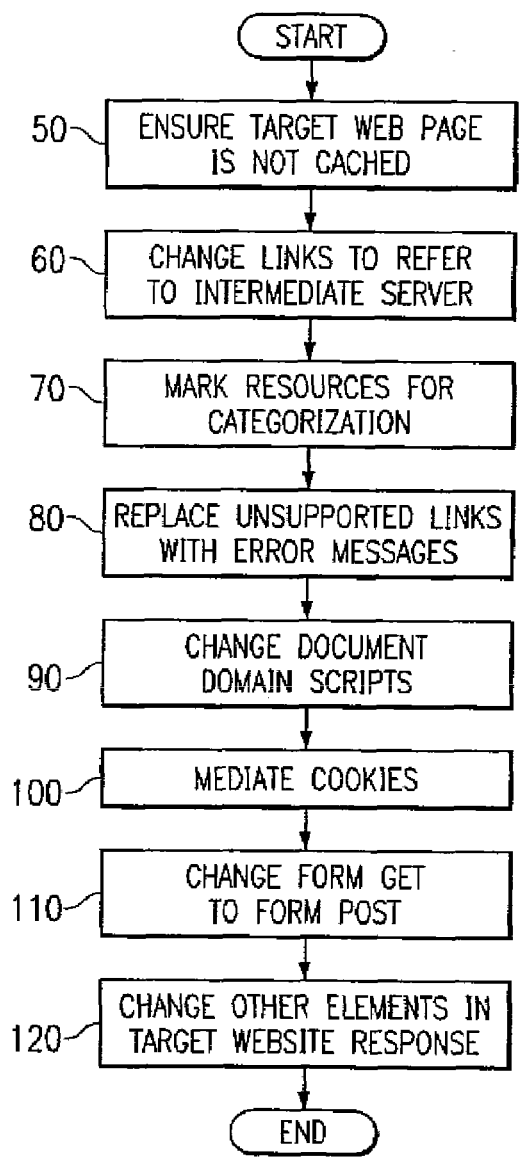
FIG. 2 shows a flow chart illustrating the method of the present invention for mediating a web page at an intermediate server.

FIG. 2 is a flow chart illustrating the process where software program 5 mediates content returned by web page 35. The HTML and other content is modified so that most interactions or requests made by the user from the mediated content are routed through intermediate server 10 rather than going directly to the target web server 30. It should be noted that the following steps do not necessarily have to be performed in the order shown.

At step 50, software program 5 ensures that web page 35 returned by target web server 30 will not be cached. This is done for several reasons. If a user wishes to define several paths through the web, in the first teaching session a particular mediated URL, e.g. "URL 1," might be used for going to web site A, while in a second teaching session, it may be used to go to web site B. The same mediated URL may be used for different web pages in successively defined paths in order to reduce the total number of hosts that will be needed to define paths. By preventing caching, the present invention ensures that any pages from the first teaching session are not stored in the memory of the user's computer for the second teaching session. If caching were allowed, when the user sent a request for "URL 1" in the second teaching session, the user would receive the mediated content of web site A which was cached in the user's computer memory instead of receiving the mediated content of web site B from software program 5. Preventing caching is also used to ensure that all interactions between browser 20 and target web server 30 are processed through intermediate sever 10. If web page 35 is cached at a user's computer, subsequent requests for a new web page 35 are processed at the user's computer rather than going through intermediate server 10. If this occurs, software program 5 can not properly track the interaction of a user at that web page (i.e. the information between browser 20 and target web server 30).

In one embodiment, software program 5 removes all META tags that have "HTTP-EQUIV="expires". . . ." or an equivalent expiration coding. Software program 5 can then prevent caching by inserting a META tag that will expire the page immediately. One of ordinary skill in the art would easily understand that this is only one example of the many ways to cause a web page to expire immediately. Other embodiments can include such methods as mediating Cache-Control headers.

At step 60, software program 5 can change links in the content of web page 35 to refer to intermediate server 10. This can be done for both absolute and relative URL links. An "absolute" URL refers to a URL that contains a protocol, a host and a port. For example, in the URL http://www.server.com:80/, http is the protocol, www.server.com is the host name and 80 is the port. If the port is left out of a URL, a default port is selected (e.g., 80 for http and 443 for https). A "relative" URL is a URL that is relative to the directory that contains the HTML. For example, if a link in a web page with the base URL http://www.server.com/ was linked to /images/test.gif, it would be equivalent to being linked to http://www.server.com/images/test.gif. Because images/test.gif is relative to the base URL http://www.server.com, the link will not actually reference the base URL and only "images/test.gif" will appear in the content of the web page.

In the case of absolute URLs, software program 5 will embed the name of target web server 30 in the file portion of the mediated URL, preceded by a special identifier. The special identifier is used so that if a user sends a command requesting the mediated URL, software program 5 will be able to locate the name of target web server 30. For example, the HTML for a link to an absolute URL <A HREF="http://www.utexas.edu"> UT </A> could become <A HREF=

"http://site1.server.com/company*www.utexas. edu">UT</A>. In this case, requests for the target web server www.utexas.edu will be routed through a host "site1.server.com" at intermediate server 10. The host "path1.server.com" can be used to define a particular target web server 30 associated with web page 35. "company*" is the special indicator which allows software program 5 to locate the target server www.utexas.edu in the file name. Software program 5 can then forward user requests for target web server www.utexas.edu to that target web server. It should be noted that target web server www.utexas.edu (e.g. target web server 30 for this particular request) may be different than target web server 30 for the user's previous request.

Because absolute URLs are identified by http or https protocols, software program 5 can identify absolute URLs in the content of web page 35 by searching the content for "http://" or "https://". This provides an advantage over systems which search content for particular types of html tags, such as the A tag, in order to identify absolute URLs because the html tags are not always used to identify URLs embedded in JavaScript, Visual Basic or other scripts. By identifying absolute URLs by protocol name, software program 5 can mediate a URL even if it was created dynamically by JavaScript. Therefore, the present invention can identify and mediate absolute URLs in a substantially greater number of web pages.

Software program 5 can also change relative URLs returned in the content of web page 35 to refer to intermediate server 10. For relative URLs, software program 5 modifies or adds a base tag to relative URLs found in the content of web page 35. For example, if index.html was a link relative to web page 35 found at http://www.utexas.edu, the base tag could be inserted to read <BASE HREF=http://www.site1.server.com/index.html>. The host name (e.g. site1.server.com) is used by software program 5 to define a particular target web server 30 for web page 35. In this example, www.site1.server.com defines http://www.utexas.edu as the target web server 30 at which /index.html is located. By inserting or modifying the base tag, the relative URL is now relative to intermediate server 10.

In addition to using hosts to define target web server 30, software program 5 can use ports. In the above examples, software program 5 could have used server.com:5001 to identify the target web server www.utexas.edu. In the case of a relative URL, for example, software program 5 could insert the base tag to read <BASE HREF=http://server.com:5001/index.html>. The use of ports to define target web server 30 can provide advantages over the use of hosts because the use of hosts is more difficult and expensive to configure. The domain name service (DNS) used by the browser 20 to find the intermediate server 10 must have entries for each of the host names used to identify target web servers. Thus, if www.utexas.edu is identified by the host www.site1.server.com and www.yahoo.com is identified by host www.site2.server.com, the DNS must contain entries for both the "site1" and "site2" hosts. Additionally, for each host name there can be an SSL certificate to allow more secure communications. However, the use of ports to define target web server 30 may not be appropriate if a user is prohibited from using ports other than 80 for http or 443 for https. This usually occurs when the user is accessing web pages through a company proxy server.

At step 70, software program 5 marks resources for proper categorization. Resources are problematic because they are requested in individual requests separate from the original request for web page 35. For example, if web page 35 has a specific image, a first request is made for web page 35, and then a second request is made to fill in the image. Because the present invention can be implemented in a system for defining a path through the web, software program 5 must be able to distinguish between requests for a new URL (e.g. a user command) and a request for a resource. Resources are also difficult to identify because resource headers returned by web servers, such as target web server 30, are often incorrect (e.g., a resource header may incorrectly mark an image as text).

When intermediate server 10 makes a request for target page 35, if an additional request is generated, software program 5 determines if the request was due to a resource source tag in the content of web page 35. This avoids relying on the image headers to determine the content of a resource. If the resource were an image, for example, software program 5 would be able to identify the resource source tag "IMG SRC." Once the resource is identified, software program 5 can append information to the suffix of the resource so that when browser 20 makes a request for the resource, software program 5 will know that it is a resource request and not an additional step in the path. For example, if the content of web page 35 caused software program 5 to request the resource "dowertx.gif," software program 5 could look for an image resource tag in the content of web page 35. For instance, the HTML in the content of web page 35 might include:

<IMG SRC="/graphics/dowertx.gif" border=0 alt="Texas">. After locating this resource source tag, software program 5 could mediate the HTML to become <IMG SRC="/graphics/dowertx.gifmgt54wi" BORDER=0 ALT="Texas">. When the mediated content of web page 35 is communicated to browser 20 from intermediate server 10, browser 20 will make a request for "dowertx.gift54wi," due to the image resource tag. Because the image is marked with "mgt54wi", software program 5 will know that browser 20 is making a resource request and that the user is not trying to define an additional step in the path, regardless of what is indicated in the resource header returned by target web server 30. It should be understood that the actual marker used could vary, but should be something unlikely to normally occur in a web page. In addition to knowing that browser 20 is making a resource request, software program 5 would know that there is no need to mediate the content returned in response to the resource request. It would be obvious to one of ordinary skill in the art that the foregoing step could be used for any other resources, such as style sheets and scripts.

At step 80, software program 5 replaces unsupported links in the content of web page 35 with error messages. This can be done so that a user will not make requests that can not be routed through intermediate server 10. For example, the common "mailto" link causes browser 20 to launch an email program. Because the email program is opened at browser 20 and email is sent through a mail server, the software program 5 will not be able to record the user's commands in the email program. Therefore, software program 5 could, for example, replace a link of mailto:test@foo.com with "javascript:alert ("Unsupported protocol). If the user clicks on the "mailto" link when defining a path, an error will now appear.

Generally, unsupported links will include those links that do not require any further interaction with intermediate server 10 (e.g. the "mailto" link). However, in one embodiment of the present invention, software program 5 can also mediate links to return an error message if the links require the use of a non-HTTP or non-HTTPs protocol, such as ftp. Although one of ordinary skill in the art would understand that the present invention could be used to mediate various protocols, one may choose to configure software program 5 such that specific protocols are not supported.

At step 90, software program 5 changes document.domain script commands to refer to the domain of intermediate server 10. In order for web pages displayed in different frames of web page 35 to communicate with each other through scripts, the different web pages must be in the same domain. Furthermore, the domain must be part of the URL of the web page 35. Because user commands are actually routed through intermediate server 10, software program 5 must change the document.domain script commands of framed web pages so that the framed web pages will interact properly once mediated. For example, if the document.domain of web page 35 was originally set to "utexas.edu" but intermediate server 10's domain is "server.com," the document.domain script commands will be changed to "server.com." As an example, software program 5 could change the HTML content returned by web page 35 from <SCRIPT LANGUAGE= JavaScript>document.domain="utexas.edu"; </SCRIPT> to <SCRIPT LANGUAGE=JavaScript> domainDisable= "utexas.edu"; document.domain="server.com"; </SCRIPT>.

Software program 5 can also mediate cookies so that intermediate server 10 can forward the appropriate cookies to web page 35 when a user's path is later replayed. At step 100, software program 5 can save any cookie along with creation details of the cookie sent with the content of web page 35 in the http-header. Software program 5 will save this information in database 15. Cookies generally contain a specific set of information, such as a date, that web page 35 wishes to store on a user's computer. Additionally cookies can contain the duration of the cookie, whether or not the cookie is secure and the web pages for which the cookie should be available. Whenever a user makes a future request, browser 20 determines if the cookie should be sent. If the cookie should be sent, browser 20 sends the specific set of information, e.g. the date, stored in the cookie, but not the creation details, duration of the cookie or the availability of the cookie. Because the actual requests to target web server 30 for web page 35 are sent from the intermediate server 10, the intermediate server 10 must be able to determine whether a specific cookie should be sent to web page 35.

There are at least two basic methods by which a cookie can be set in browser 20 by web page 35. In the first method, target web server 30 sends the cookie and creation details of the cookie in the http-response header. In this case, software program 5 can capture the cookie and the creation details directly from the header. When a user makes additional requests for web page 35 through intermediate server 10, software program 5 can check whether the cookie should be included in such additional requests for web page 35. The second method is to set a cookie using JavaScript. For example, the script embedded in the content of web page 35 could read:

<SCRIPT LANGUAGE=JavaScript>
var expires=new Date( );
expires.setTime(expires.getTime( )+1000*60*60*24);
document.cookie="visited="+newDate( )+";expires="+ expires.toGMTString( );
</SCRIPT>

In the foregoing example, if the web page 35 was first loaded by the user on March 3, the cookie would record this fact. Furthermore, the cookie could be set to expire in one day. If the user made additional requests for web pages, browser 20 would determine whether the "visited" cookie should be sent back. If the cookie should be sent, browser 20 would simply send back "March 3." However, since the intermediate server 10 makes the actual request to the target web server 30 for the contents of web page 35, software program 5 must be able to determine whether the cookie should be sent. Because the date visited and the expiration time are now set on browser 20, browser 20 will not send this information with each request. Therefore, software program 5 must be able to capture the visited date and expiration information contained in the document.cookie line of the script. Additionally, software program 5 should ensure 1) that the cookie is distinguishable from other cookies that might be used by software program 5 and 2) that the cookie will be sent because its domain matches that of intermediate server 10. In order to accomplish these goals, software program 5 can mediate the JavaScript to set two cookies. The mediated JavaScript could take the following form:

<SCRIPT LANGUAGE=JavaScript>
var expires=new Date( );
expires.setTime(expires.getTime( )+1000*60 60*24);
ServerCookie="visited="+newDate( )+";expires="+ex- pires.toGMTString( );ServerSetCookie(1);
</SCRIPT>

The document.cookie line in the original script has been changed to ServerCookie, which is a variable rather than being set directly. The ServerSetCookie function can be used to a set both the cookie that web page 35 desired to set and a second cookie that contains all the creation details (e.g., expiration date, pages for which the cookie should be available, etc) for the cookie web page 35 desired to set. Again, using the example of the user whom requested web page 35 on March 3, prior to mediation browser 20 would only have sent "March3." After the JavaScript is mediated by software program 5, browser 20 will send back "March 3" along the creation details of the cookie. Because the creation details are included, software program 5 will know whether to send the cookie to web page 35. Software program 5 will save the string used to set the cookie and the current date at database 15. By knowing the current date and the creation details, the software program 5 will be able to determine the proper time range in which to send a cookie when the user's path is later replayed. For example, if the current date is October 17, software program 5 could send "October 17" to web page 35 and modify the cookie so that the cookie will expire on October 18, rather than March 4.

Software program 5 can also circumvent limitations in certain web servers, such as IIS, on the number of characters that can be used to represent a form "GET" submission. If web page 35 contains a form GET submission, software program 5 can change the form "GET" to a form "POST" submission, at step 110, because POSTs have no character number limitations. Software program 5 will also mark which form submissions have been changed from a form "GET" to a form "POST" so that when the user's path is replayed, the marked form submissions can be changed back to a form "GET" from a form "POST." This marking can be done in the same fashion as the marking in step 70.

At step 120, software program 5 can mediate the location response header (which refers to a URL) to redirect browser 20 to intermediate server 10 rather than target web server 30. This can be done so that if a particular web site redirects browser 20 to another web site, browser 20 can instead be redirected to intermediate server 10. The mediation can be done in the same manner as at step 60.

After performing all or a subset of steps 50-120, software program 5 can end a teaching session. This can be done when the user indicates that they are done with a teaching session, e.g. by clicking on an "end teaching" button, or when the user has made a predetermined number of requests. Throughout the teaching process, software program 5 has compiled a request history at database 15 that contains the saved URL requests and the corresponding data such as cookies, headers and form parameters. This request history can be later used to replay the user's path through both dynamic and static web pages.

Although the present invention has been described in detail, it should be understood that various changes, substitutions and alterations can be made hereto without departing from the spirit and scope of the invention as described by the appended claims.

What is claimed is:

1. A method for mediating a web page at an intermediate server comprising: recording a request for a web page as a first portion of a user path;
   retrieving the web page from a target web server;
   ensuring that the web page will not be cached;
   identifying an absolute URL in the web page according to a protocol;
   changing the absolute URL to refer to the intermediate server;
   identifying a resource according to a resource source tag in the web page;
   mediating a link to the resource with a resource marking to indicate that a resource returned in response to a subsequent resource request including the resource marking should not be mediated;
   receiving a subsequent resource request for the resource; and
   retrieving the resource and returning the resource to the web browser without recording the subsequent resource request as part of the user path.

2. The method of claim 1, further comprising changing a relative URL in the web page to refer to the intermediate server.

3. The method of claim 1, further comprising recording a set of creation details for a cookie.

4. The method of claim 1, wherein the step of ensuring that the web page will not be cached comprises setting the web page to expire immediately.

5. The method of claim 1, further comprising:
   changing a relative link in the web page to refer to the intermediate server, further comprising:
      if the relative link contains a base tag, modify the base tag to refer to the intermediate server; and
      if the relative link does not contain the base tag, insert a reference base tag, wherein the reference base tag refers to the intermediate server.

6. A method for storing user paths through web pages:
   receiving a request for a first web page at an intermediate server;
   recording the request as a first portion of a user path;
   requesting the first web page from a target web server hosting the first web page;
   retrieving the first web page from a the target web server;
   ensuring that the first web page will not be cached;
   changing a plurality of links in the first web page to refer to the intermediate server to create a mediated web page, wherein changing the plurality of links further comprises changing at least one dynamic link to refer to the intermediate server;
   identifying a resource according to a resource source tag in the first web page; and
   mediating a link to the resource with a resource marking to indicate that a resource returned in response to a subsequent resource request including the resource marking should not be mediated;
   receiving a subsequent request for a second web page based on the mediated web page;
   identifying the resource according to a resource source tag in the second web page;
   recording the subsequent request for a second web page as a second portion of the user path at the intermediate server; and
   retrieving the resource and returning the resource to the web browser without recording the subsequent resource request as part of the user path, including requesting the second web page from a target web server hosting the second web page.

7. The method of claim 6, wherein the dynamic link is a relative link, and the step of changing a relative link in the web page further comprises:
   if the relative link contains a base tag, modifying the base tag to refer to the intermediate server; and
   if the relative link does not contain the base tag, inserting a reference base tag, wherein the reference base tag refers to the intermediate server.

8. The method of claim 6, wherein the step of ensuring that the first web page will not be cached comprises setting the web page to expire immediately.

9. The method of claim 6, wherein the dynamic link is an absolute URL, and further comprising identifying the absolute URL by a protocol specified in the absolute URL.

10. The method of claim 6, wherein the step of changing a dynamic link to refer to the intermediate server further comprises using a host name to define the target web server associated with the first web page.

11. The method of claim 6, wherein the step of changing a dynamic link to refer to the intermediate server further comprises using a port to define the target web server associated with the first web page.

12. The method of claim 6, further comprising:
   identifying a resource type according to a resource source tag in the first web page; and
   mediating a link to the resource with a resource marking to indicate that a resource returned in response to a subsequent resource request including the resource marking should not be mediated.

13. The method of claim 12, wherein the resource source tag indicates that a resource is an image.

14. The method of claim 6, further comprising changing a document.domain script command to refer to a domain for the intermediate server.

15. The method of claim 6, further comprising recording a set of creation details for a first cookie at the intermediate server.

16. The method of claim 15, wherein the set of creation details is recorded from an http-header.

17. The method of claim 15, further comprising causing a browser to send a second cookie to the intermediate server, wherein the second cookie includes the set of creation details for the first cookie.

18. The method of claim 6, further comprising changing a form GET submission to a form POST submission.

19. A system for mediating a web page at an intermediate server comprising:
   a computer readable medium; and
   software instructions stored on the computer readable medium, wherein the software instructions are executable to:
      receive a request for a first web page at an intermediate server;
      record the request as a first portion of a user path;
      request the first web page from a target web server hosting the first web page;
      retrieve the first web page from the target web server;

ensure that the first web page will not be cached;
change a plurality of links in the first web page to refer to the intermediate server to create a mediated web page, wherein changing the plurality of links further comprises changing at least one dynamic link to refer to the intermediate server;
identify a resource according to a resource source tag in the first web page; and
mediate a link to the resource with a resource marking to indicate that a resource returned in response to a subsequent resource request including the resource marking should not be mediated;
receive a subsequent request for a second web page based on the mediated web page;
identify the resource type according to a resource source tag in the second web page;
record the subsequent request for a second web page as a second portion of the user path at the intermediate server; and
retrieve the resource and returning the resource to the web browser without recording the subsequent resource request as part of the user path, including requesting the second web page from a target web server hosting the second web page.

20. The system of claim 19, wherein the software instructions are further executable to ensure that the first web page will not be cached by setting the web page to expire immediately.

21. The system of claim 19, wherein the dynamic link is a relative link, and wherein the software instructions are further executable to:
if the relative link contains a base tag, modify the base tag to refer to the intermediate server; and
if the relative link does not contain the base tag, insert a reference base tag, wherein the reference base tag refers to the intermediate server.

22. The system of claim 19, wherein the software instructions are further executable to use a host name to define the target web server associated with the first web page.

23. The system of claim 19, wherein the software instructions are further executable to use a port to define the target web server associated with the first web page.

24. The system of claim 19, wherein the dynamic link is an absolute URL, and wherein the software instructions are further executable to identify the absolute URL by a protocol.

25. The system of claim 19, wherein the software instructions are further executable to change a document.domain script command to refer to a domain for the intermediate server.

26. The system of claim 19, wherein the software instructions are further executable to record a set of creation details for a first cookie.

27. The system of claim 26, wherein the software instructions are further executable to record the set of creation details from an http-header.

28. The system of claim 26, wherein the software instructions are further executable to cause a browser to send a second cookie to the intermediate server, wherein the second cookie includes the set of creation details for the first cookie.

29. The system of claim 19, wherein the software instructions are further executable to change a form GET submission to a form POST submission.

30. A method of mediating a web page comprising:
at an intermediate server:
receiving a web page request from a browser;
recording the web page request as part of a user path;
forwarding the web page request to a target web server;
receiving the web page from the target web server;
changing supported links in the web page to refer to the intermediate server to create mediated content, wherein changing supported links further comprises:
identifying a resource according to a resource source tag in the web page; and
mediating a link to the resource with a resource marking to indicate that a resource returned in response to a subsequent resource request including the resource marking should not be mediated;
forwarding the mediated content to the web browser, wherein the mediated content includes the resource marking; and
receiving the subsequent resource request from the browser for the resource;
retrieving the resource and returning the resource to the web browser without recording the subsequent resource request as part of the user path;
at the browser:
generating the resource request that includes the resource marking based on the mediated content.

31. The method of claim 30, further comprising:
at the intermediate server:
distinguishing the resource request from a new web page request based on the resource marking.

32. The method of claim 30, further comprising:
at the intermediate server:
recording the creation details of a first cookie;
causing the browser to send a second cookie to the intermediate server that contains the creation details of the first cookie; and
at the browser:
generating the second cookie containing the creation details of the first cookie; and
sending the second cookie to the intermediate server.

* * * * *